United States Patent [19]
von Wedel et al.

[11] Patent Number: 5,463,170
[45] Date of Patent: Oct. 31, 1995

[54] PROCESS FOR THE DEGRADATION OF HIGHLY TOXIC HALOGENATED ORGANIC COMPOUNDS CONTAINED IN GASES

[75] Inventors: Wedigo von Wedel, Paris, France; Hubertus Eickhoff, Alzenau, Germany; Manfred Weck, Alzenau, Germany; John Tarabocchia, Friedrichsdorf, Germany; Ulrich Schelbert, Alzenau, Germany; Alexander Möller, Gelnhausen, Germany

[73] Assignee: Degussa Aktiengesellschaft, Frankfurt, Germany

[21] Appl. No.: 198,055

[22] Filed: Feb. 18, 1994

[30] Foreign Application Priority Data

Feb. 20, 1993 [DE] Germany .................. 43 05 344.0

[51] Int. Cl.$^6$ .................................. B01D 53/70
[52] U.S. Cl. .................. 588/207; 423/240 S; 423/240 R
[58] Field of Search .................... 423/240 S, 240 R; 588/206, 207

[56] References Cited

U.S. PATENT DOCUMENTS

| | | | |
|---|---|---|---|
| 3,989,807 | 11/1976 | Johnston | 423/488 |
| 4,485,081 | 11/1984 | Magistro | 423/240 S |
| 4,780,287 | 10/1988 | Zeff et al. | 422/186.3 |

FOREIGN PATENT DOCUMENTS

| | | |
|---|---|---|
| 2083921 | 5/1993 | Canada. |
| 0373312 | 6/1990 | European Pat. Off.. |
| 3733208 | 6/1989 | Germany. |
| 4010321 | 10/1991 | Germany .................. 423/240 S |
| 4117477 | 12/1992 | Germany .................. 423/240 R |
| WO91/1049 | 7/1991 | WIPO. |
| 92/19364 | 11/1992 | WIPO. |

OTHER PUBLICATIONS

Holleman, A. F., et al., "Lehrbuch Der Anorganischen Chemie", Berlin 1964, p. 180 (no month).

*Primary Examiner*—Ferris Lander
*Assistant Examiner*—Stuart L. Hendrickson
*Attorney, Agent, or Firm*—Beveridge, DeGrandi, Weilacher & Young

[57] ABSTRACT

Disclosed is a process for the degradation of highly toxic halogenated organic compounds, in particular polychlorinated dibenzodioxins (PCDD) and dibenzofurans (PCDF), contained in gases containing no $SO_2$ by oxidation using preferably hydrogen peroxide. The $SO_2$-free gas is passed, in the presence of hydrogen peroxide, over a substantially inorganic solid contact catalyst, in particular pyrogenic or precipitated silica or aluminum silicate. A residual PCDD/PCDF content of below 0.1 ng TE/$Nm^3$ may be achieved in the thus treated gas; the highly toxic compounds are oxidized on the solid contact catalyst.

21 Claims, No Drawings

PROCESS FOR THE DEGRADATION OF HIGHLY TOXIC HALOGENATED ORGANIC COMPOUNDS CONTAINED IN GASES

INTRODUCTION AND BACKGROUND

The present invention relates to a process for the degradation of highly toxic organic compounds, in particular polychlorinated dibenzodioxins (PCDD) and dibenzofurans (PCDF), contained in gases containing no $SO_2$ wherein the highly toxic compounds are removed from the gas by oxidation. The gases may in particular be waste gases from chemical processes and waste gases from refuse incinerators, wherein the gases may additionally contain other pollutants, such as $NO_x$, but they do not contain sulfur dioxide.

Increasing significance is being attached both in public debate, and generally in terms of process optimization, to the reduction of emissions of highly toxic halogenated organic compounds, such as in particular PCDDs and PCDFs, as may be contained in the gases arising from chemical and incineration processes. The content of highly toxic PCDDs and PCDFs in such gases may be in the range of 0.1 ng $TE/Nm^3$ to approximately 30 ng $TE/Nm^3$ (ng $TE/Nm^3$= nanogram toxic equivalent per normal cubic meter). In the 17th implementing regulations of the German Federal emission control law, legislators have provided a limiting value of 0.1 ng $TE/Nm^3$ beginning in 1996, so improved processes for the removal or degradation of pollutants are consequently required to achieve the legal limiting value.

The highly toxic halogenated organic compounds are in particular PCDDs and PCDFs of varying degrees of chlorination (n and m in the following formula stand for an integer from 1 to 8), which occur in numerous isomers or congeners of varying toxicities:

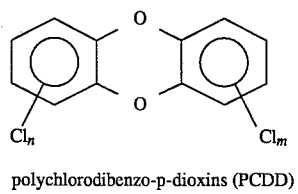

polychlorodibenzo-p-dioxins (PCDD)

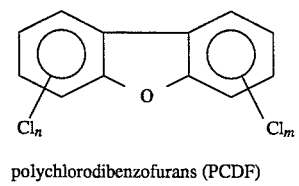

polychlorodibenzofurans (PCDF)

As is known in this art, the above-mentioned TE value is calculated by multiplying the concentrations of the individual PCDDs and PCDFs by the appropriate NATO-CCMS toxic equivalent factor and by adding the results together. The particularly highly toxic 2,3,7,8-tetrachlorodibenzodioxin has a TE factor of 1. Other TE factors are mentioned by way of example: 0.5 for 1,2,3,7,8-pentaCDD; 0.1 for 1,2,3,4,7,8-hexaCDD; 0.1 for 2,3,7,8-tetraCDF; 0.5 for 2,3,4,7,8-pentaCDF; 0.1 for 1,2,3,4,7,8-hexaCDF.

Previously, those pollutants of the PCDD or PCDF type contained in gases such as flue gases from incineration processes were removed by passing the gases over adsorbents. Adsorption processes using a moving or fixed bed with hearth-oven coke and direct duct injection entrained-bed processes with added lime/activated charcoal are known. Adsorption processes have the disadvantage that a waste gas problem becomes a solid waste problem because the pollutant-laden adsorbent must either be expensively regenerated or disposed of as hazardous waste. Moreover, safety hazards are associated with plants with adsorbers filled with activated charcoal due to CO formation in "hot spots" or even combustion, which makes expensive safety measures necessary.

According to the process disclosed in DE 40 01 305, dioxins and furans may be removed from flue gases by treating the flue gases, after a wet scrubbing stage, with UV radiation of a wavelength of below 310 nm (preferably below 245 nm) in the presence of added hydrogen peroxide. According to the examples in DE 40 01 305, residual dioxin/furan contents of only 1 ng $TE/Nm^3$ are obtained; this process is clearly not suitable for achieving the residual contents pursuant to the future legal limiting value of 0.1 ng $TE/Nm^3$. Additionally, there are costly technical difficulties related to the use of the required energy in the form of UV radiation.

The German patent application DE 42 10 055.0 discloses a process for the removal of halogenated compounds such as PCDDs and PCDFs from waste gases optionally containing $NO_x$, wherein the waste gas is optionally passed through a fixed or fluidized bed and is brought into contact with Caro's acid ($H_2SO_5$) or a salt thereof. The Caro's acid may be formed in situ from hydrogen peroxide and sulfuric acid (which is added or is produced from the sulfur dioxide present in the waste gas to be treated and $H_2O_2$). Catalytically active solids utilized are inter alia pyrogenic and precipitated silicas, alumina, titanium dioxide and zeolites. DE 42 10 055.0 teaches that Caro's acid plays a decisive part in the oxidation of PCDDs and PCDFs; if the gas to be treated contains no or only a little $SO_2$, $SO_2$ or $H_2SO_4$ must be added. Although the highly toxic dioxins and furans are over 90% degraded on the solid to less toxic products under the processing conditions, and only a small proportion remains adsorbed on the solid, it must be considered disadvantageous that only gases containing $SO_2$ are suitable for the process or that $SO_2$ or $H_2SO_4$ must be added.

SUMMARY OF THE INVENTION

An object of the present invention is to provide a process for the degradation of highly toxic halogenated organic compounds, in particular polychlorinated dibenzodioxins (PCDD) and dibenzofurans (PCDF), contained in gases containing no $SO_2$. The process involves treating the $SO_2$-free gases with a peroxy compound, which process avoids the disadvantages of the prior art processes. The process should additionally be capable of reliably achieving the limiting value of 0.1 ng $TE/Nm^3$. The process concerns passing the $SO_2$-free gas over a substantially inorganic solid contact catalyst in the presence of hydrogen peroxide or a compound releasing hydrogen peroxide under the conditions of the process, without using Caro's acid ($H_2SO_5$) or salts thereof.

DETAILED DESCRIPTION OF THE INVENTION

The term "peroxy compounds" as used herein means peroxy compounds added to the gas or to the solid contact catalyst which are hydrogen peroxide or compounds capable of releasing hydrogen peroxide under the conditions employed herein, such as peroxides, perborates, percarbonates, persilicates together with alkali metal or alkaline earth metal perphosphates. Salts are added in the form of an aqueous solution or suspension, preferably in such a manner that an effective quantity of the peroxy compound comes into contact with the solid contact catalyst for the purposes of activation. It has not yet been clarified whether the stated peroxy salts are themselves active or whether hydrogen peroxide must first be released. Therefore, Applicants do not wish to be bound by any theory. Hydrogen peroxide is preferably used as an aqueous solution of a desired concentration, preferably 30 to 70 wt. %. The aqueous $H_2O_2$ solution is introduced into the system in an effective quantity. In this context, "effective" means that the quantity of the peroxy compound (e.g., $H_2O_2$) is sufficient to be able to oxidize both any readily oxidizable pollutants which may be present and dioxins and furans. Hydrogen peroxide is customarily used in excess in relation to the dioxins and furans.

The gas to be treated containing the toxic organic compounds is passed, in the presence of a peroxy compound, over a sufficiently catalytically active solid, which is conveniently arranged in the form of a fixed or fluidized bed. Contact time is dependent upon the desired pollutant degradation and can vary widely. Naturally, in the case of the preferred fixed bed, contact time may be increased by reducing the velocity of the gas and increasing the depth of the fixed bed as will be understood in the art. Good results may be achieved with gas velocities in the range 0.1 to 5 m/s.

The peroxy compound is either directly added to the gas to be treated or is applied to the solid contact catalyst, for example by soaking the solid contact catalyst or by spraying the solid contact catalyst with an aqueous solution of the peroxy compound. Preferably, an aqueous hydrogen peroxide solution is added directly to the toxic chemical containing gas, which generally has to be treated as a continuous stream. The treatment of the gas is preferably performed by spraying an aqueous $H_2O_2$ solution into the gas stream or by introducing $H_2O_2$ vapor into the gas stream. A variety of conventional equipment can be used for this purpose.

Treatment of the gas which is free of $SO_2$ is preferably performed at above the dew point of the gas, so as to avoid condensation on the solid contact catalyst. A temperature in the range from above the dew point (in particular at least 5° C. above the dew point) to 180° C. (preferably 120° C.) is particularly suitable. Since the dew point of combustion gases after wet scrubing is frequently between 40° and 60° C., treatment is preferably performed in such cases in the range from 80° C. to 120° C. Customary apparatus used in the art can maintain the temperature within the desired range. If salts are used as the peroxy compound capable of generating $H_2O_2$, it may be convenient to cause condensation at least temporarily by reducing the temperature below the dew point in order to wash off any salts deposited on the fixed bed with the condensate and in order to maintain activity of the contact catalyst.

The following known materials, either individually or mixed together, may be used as substantially inorganic solid contact catalysts in finely divided form, shaped as pellets, tablets or any other shapes, including honeycombs, or applied to shaped supports:

silica gels, kieselguhr, precipitated silicas, pyrogenic silicas, silicas which have been surface-modified, for example rendered hydrophobic;

natural and synthetic silicates, including calcium and aluminum silicates, phyllosilicates;

zeolites, such as mordenite, ZSM-5 zeolites, dealuminated Y-zeolites;

metal oxides, such as gamma and alpha $Al_2O_3$ and titanium dioxide and sintered glasses;

above-stated materials and other supports having on their surface oxides of the elements iron, chromium, manganese, vanadium, molybdenum or tungsten, heteropolyacids of the molybdophosphate and tungstophosphate series.

As the term is used herein, "inorganic solid contact catalysts" mean the above and other similar materials known in the art. Such substances are substantially or essentially inorganic in nature which means they may contain trace amounts of organics used for modifying their properties, such as imparting hydrophobic properties for example. Some of the solid contact catalysts have very different activities as they adsorb the PCDDs and PCDFs and catalyze the oxidation reaction to a variable extent. Silicas have proved to be particularly preferred solid contact catalysts as adsorption catalysts and appear to be optimally balanced in terms of their use for pollutant degradation according to the present invention: at a degradation rate of over 90%, only small quantities of pollutants remain adsorbed on the contact catalyst, wherein the adsorbed quantity scarcely increases even during continuous operation, such that activity does not deteriorate even after several months' continuous operation. In contrast, the tested 12-ring zeolites (mordenite and dealuminated Y-zeolite) proved to adsorb well but were less catalytically active, although a residual content of less than 0.1 ng $TE/Nm^3$ in the treated gas was also achieved here.

The particularly preferred solid contact catalysts, pyrogenic amorphous silicas with a specific surface area (BET) of 100 to 380 $m^2/g$ were used as tablets (6×5.5 mm) or precipitated silicas as extrudate (7×6 mm).

The process according to the present invention may be integrated into known gas purification processes.

It has been found that neither peroxy compound alone, e.g., hydrogen peroxide (i.e., in the absence of a solid contact catalyst), nor the solid contact catalyst alone (i.e., without added peroxy compound such as hydrogen peroxide), is capable of degrading the highly toxic halogenated organic compounds. It is instead the combination of the inorganic solid contact catalyst and peroxy compound (e.g., hydrogen peroxide) which is required not only to remove practically 100% of the pollutants from the gas, but to simultaneously substantially degrade the pollutants to less toxic substances.

The process according to the present invention is characterized by its elevated efficiency while simultaneously being easy to handle and requiring low investment in necessary plant and equipment. Residual values of below 0.1 ng $TE/Nm^3$ may be achieved without problems and in fact generally at a degradation rate of over 90%. The solid contact catalyst is incombustible and has an extended service life; in the case of the particularly preferred solid contact catalyst, there was no decline in activity even after several months' operation. In contrast with the teaching of DE-P 42 10 055.0, it surprisingly proved unnecessary to add $SO_2$ or $H_2SO_4$ to gases containing no $SO_2$ in order to form Caro's acid.

EXAMPLE

Dross furnace waste gas, containing no sulfur dioxide ($SO_2$), contained PCDDs and PCDFs in a quantity of 12.6 ng $TE/Nm^3$. The objective was to reduce the PCDD/PCDF content to below 0.1 ng $TE/Nm^3$, wherein the contaminated gas was combined with hydrogen peroxide and the gas mixture was passed over a solid contact catalyst arranged in a fixed bed.

The tubular reactor for the solid contact catalyst contained 65 g of $SiO_2$ tablets, produced from pyrogenic silicon dioxide with a BET surface area of 200 $m^2/g$; reactor temperature 80° C.; isothermal operation achieved by silver sheathing of reactor. Dew point of the gas was 55° C. Using a dose meter, a 50 wt. % aqueous $H_2O_2$ solution was fed at a rate of 0.01 ml/min into a heat exchanger, the temperature of which was held constant at 90° C. vaporized and mixed into the waste gas stream. The volumetric flow rate of the waste gas (crude gas) was 1 $Nm^3/h$.

The gas mixture containing $H_2O_2$ was passed over the fixed bed contact catalyst for 6 hours. Both the crude gas entering and the pure gas leaving the contact catalyst were analyzed for their PCDD and PCDF content in accordance with VDI guideline 3499, sheet 1 E (03/90 edition); the toxic equivalents (TE) were calculated in accordance with the internationally recognized NATO-CCMS toxic equivalent factor list. Sampling was performed with XAD-2 cartridges with a $C^{13}$ 1234-tetraCDD standard, dioxin/furan determination by GC-MS. The quantity of PCDD/PCDF adsorbed onto the contact catalyst after 6 hours operation was also analyzed.

The following results were obtained:

Crude gas: 12.6 ng $TE/Nm^3$

Pure gas: 0.05 ng $TE/Nm^3$

Contact catalyst: 0.04 ng TE/g

The dioxins and furans contained in the crude gas are thus surprisingly practically entirely degraded; only traces of dioxins/furans remain on the contact catalyst at the end of the test. These substances do not, however, accumulate on the contact catalyst even after longer testing.

Further variations and modifications of the foregoing will be apparent to those skilled in the art and such variations and modifications are attended to be encompassed by the claims that are appended hereto.

What is claimed:

1. A process for the degradation of highly toxic halogenated organic compounds contained in a gas containing no $SO_2$ with a peroxy compound, said process comprising passing said gas at a temperature above the dew point of said gas up to 180° C. over an inorganic solid contact catalyst in the presence of a peroxy compound to form a treated gas, wherein said peroxy compound is not Caro's acid ($H_2SO_5$) or salts thereof, and wherein said halogenated organic compounds are polychlorinated dibenzodioxins and dibenzofurans.

2. The process according to claim 1, wherein said peroxy compound is hydrogen peroxide or a compound capable of releasing hydrogen peroxide under the conditions of the process.

3. The process according to claim 2, wherein said compound releasing hydrogen peroxide is selected from the group consisting of peroxides, perborates, percarbonates, persilicates, alkali metal perphosphates, alkaline earth metal perphosphates, and salts thereof.

4. The process according to claim 1, wherein said passing is at a temperature at least 5° C. above the dew point of said gas up to 120° C.

5. The process according to claim 1, wherein said passing is at a temperature from 80° to 120° C.

6. The process according to claim 1, wherein said peroxy compound is added to said gas or is applied to said solid contact catalyst.

7. The process according to claim 1, wherein said inorganic solid contact catalyst is selected from the group consisting of silica gels, kieselguhr, precipitated silicas, pyrogenic silicas, surface-modified silicas, natural silicates, synthetic silicates, zeolites, metal oxides, and sintered glasses.

8. The process according to claim 7, wherein said inorganic solid contact catalyst is selected from the group consisting of hydrophobic silicas, calcium silicates, aluminum silicates, phyllosilicates, mordenite, ZSM-5 zeolites, dealuminated Y-zeolites, gamma $Al_2O_3$, alpha $Al_2O_3$, and titanium dioxide.

9. The process according to claim 7, wherein said inorganic solid contact catalyst has on its surface an oxide selected from the group consisting of the oxides of iron, chromium, manganese, vanadium, molybdenum and tungsten.

10. The process according to claim 1, wherein said inorganic solid contact catalyst is a molybdophosphate heteropolyacid or a tungstophosphate heteropolyacid.

11. The process according to claim 7, wherein said inorganic solid contact catalyst is pyrogenic amorphous silica with a BET specific surface area of 100 to 380 $m^2/g$.

12. The process according to claim 1, wherein said treated gas contains no more than 0.1 ng $TE/Nm^3$ of said toxic halogenated organic compounds.

13. The process according to claim 1, wherein said inorganic solid contact catalyst is fixed or fluidized.

14. The process according to claim 1, wherein said inorganic solid contact catalyst is in pellet or tablet form.

15. The process according to claim 1, wherein said treated gas contains less than 0.1 ng $TE/Nm^3$ of said toxic halogenated organic compounds.

16. The process according to claim 1, wherein said process degrades over 90% of said toxic halogenated organic compounds.

17. The process according to claim 2, wherein said hydrogen peroxide is an aqueous solution of 30 to 70 wt % of hydrogen peroxide.

18. A process for the degradation of highly toxic halogenated organic compounds contained in a gas containing no $SO_2$ with a peroxy compound, said process comprising passing said gas over an inorganic solid contact catalyst in the presence of a peroxy compound to form a treated gas, wherein said peroxy compound is not Caro's acid ($H_2SO_5$) or salts thereof, wherein said halogenated organic compounds are polychlorinated dibenzodioxins and dibenzofurans, and wherein said inorganic solid contact catalyst is a molybdophosphate heteropolyacid or a tungstophosphate heteropolyacid.

19. A process for the degradation of highly toxic halogenated organic compounds contained in a gas containing no $SO_2$ with a peroxy compound, said process comprising passing said gas over an inorganic solid contact catalyst in the presence of a peroxy compound to form a treated gas, wherein said peroxy compound is not Caro's acid ($H_2SO_5$) or salts thereof, wherein said halogenated organic compounds are polychlorinated dibenzodioxins and dibenzofurans, and wherein said passing is at a temperature above the dew point of said gas.

20. The process according to claim 19, wherein said treated gas contains less than 0.1 ng $TE/Nm^3$ of said toxic halogenated organic compounds.

21. The process according to claim 9, wherein said inorganic solid contact catalyst has on its surface an oxide selected from the group consisting of the oxides of iron, chromium, vanadium, molybdenum and tungsten.

* * * * *